United States Patent
Dusevic et al.

(10) Patent No.: US 10,248,803 B2
(45) Date of Patent: Apr. 2, 2019

(54) INTERNAL FOLDER SHARING

(71) Applicant: Intermedia.net, Inc., Sunnyvale, CA (US)

(72) Inventors: Bojan Dusevic, New York, NY (US); Andrew Gachechiladze, Sunnyvale, CA (US); Nikita Uraltsev, Saint-Petersburg (RU); Alexander Prokofiev, Saint-Petersburg (RU); Leonid Antonenkov, St. Petersburg (RU)

(73) Assignee: Intermedia.net, Inc., Mountain View, CA (US)

( * ) Notice: Subject to any disclaimer, the term of this patent is extended or adjusted under 35 U.S.C. 154(b) by 1065 days.

(21) Appl. No.: 14/271,846

(22) Filed: May 7, 2014

(65) Prior Publication Data
US 2014/0337386 A1 Nov. 13, 2014

Related U.S. Application Data

(60) Provisional application No. 61/820,793, filed on May 8, 2013.

(51) Int. Cl.
*G06F 17/30* (2006.01)
*G06F 21/62* (2013.01)
(Continued)

(52) U.S. Cl.
CPC .... *G06F 21/6218* (2013.01); *G06F 17/30123* (2013.01); *G06F 17/30174* (2013.01);
(Continued)

(58) Field of Classification Search
CPC ..... H04L 63/08; H04L 67/06; H04L 67/1095; G06F 17/3028
(Continued)

(56) References Cited

U.S. PATENT DOCUMENTS 6,324,587 B1 * 11/2001 Trenbeath ............. H04L 63/105
  709/206
6,401,079 B1 * 6/2002 Kahn .................. G06Q 20/102
  705/30
(Continued)

FOREIGN PATENT DOCUMENTS

WO   WO-2015171846 A1   11/2015

OTHER PUBLICATIONS

"U.S. Appl. No. 14/271,918, Non-Final Office Action dated Jul. 15, 2015", 13 pgs.
(Continued)

*Primary Examiner* — Alex Gofman
*Assistant Examiner* — Linh Black
(74) *Attorney, Agent, or Firm* — Schwegman Lundberg & Woessner, P.A.

(57) ABSTRACT

A method and system of sharing a folder in a file system between an owner and a grantee is provided. An indication of a folder to share with a grantee may be received from the owner. The folder to share may be a subfolder within a parent folder, the parent folder not shared with the grantee. Then, sharing permissions indicating a level of access the grantee has to the folder may be stored with the folder. A virtual folder corresponding to the folder to share may be created on a device of the grantee. The virtual folder maps to all objects within the folder to share and may be stored at a level equal to parent folders of a file hierarchy on device of the grantee.

17 Claims, 8 Drawing Sheets

(51) Int. Cl.
  *G06F 21/31* (2013.01)
  *H04L 29/06* (2006.01)
(52) U.S. Cl.
  CPC ........ *G06F 17/30203* (2013.01); *G06F 21/31* (2013.01); *G06F 21/6227* (2013.01); *H04L 63/06* (2013.01); *H04L 67/42* (2013.01)
(58) Field of Classification Search
  USPC ........ 707/821–826, 781, 785–786, 610–611, 707/620, 624
  See application file for complete search history.

(56) References Cited

U.S. PATENT DOCUMENTS

| | | | |
|---|---|---|---|
| 6,564,369 B1* | 5/2003 | Hove | G06F 8/71 713/1 |
| 2005/0144195 A1* | 6/2005 | Hesselink | H04L 63/0209 |
| 2007/0130143 A1* | 6/2007 | Zhang | G06F 17/30893 |
| 2009/0077262 A1* | 3/2009 | Roberts | G06F 11/1662 709/248 |
| 2010/0306314 A1 | 12/2010 | O'connell, Jr. et al. | |
| 2012/0166818 A1 | 6/2012 | Orsini et al. | |
| 2012/0265976 A1 | 10/2012 | Spiers et al. | |
| 2013/0013560 A1* | 1/2013 | Goldberg | G06F 17/30174 707/634 |
| 2013/0275509 A1 | 10/2013 | Micucci et al. | |
| 2013/0282830 A1 | 10/2013 | Besen et al. | |
| 2013/0283232 A1* | 10/2013 | Van Megchelen | G06F 17/30235 717/106 |
| 2014/0337290 A1 | 11/2014 | Uraltsev et al. | |
| 2014/0372750 A1 | 12/2014 | Antonenkov et al. | |

OTHER PUBLICATIONS

"International Application Serial No. PCT/US2015/029586, International Search Report dated Aug. 7, 2015", 2 pgs.
"International Application Serial No. PCT/US2015/029586, Written Opinion dated Aug. 7, 2015", 11 pgs.
"U.S. Appl. No. 14/271,918, Examiner Interview Summary dated Mar. 1, 2016", 3 pgs.
"U.S. Appl. No. 14/271,918, Examiner Interview Summary dated Sep. 17, 2015", 3 pgs.
"U.S. Appl. No. 14/271,918, Final Office Action dated Dec. 30, 2015", 18 pgs.
"U.S. Appl. No. 14/271,918, Non Final Office Action dated Jun. 7, 2016", 19 pgs.
"U.S. Appl. No. 14/271,918, Response filed Feb. 25, 2016 to Final Office Action dated Dec. 30, 2015", 12 pgs.
"U.S. Appl. No. 14/271,918, Response filed Oct. 20, 2015 to Non-Final Office Action dated Jul. 15, 2015", 17 pgs.

* cited by examiner

INTERNAL FOLDER SHARING

CROSS-RELATION TO RELATED APPLICATIONS

This application claims priority to U.S. Provisional Application No. 61/820,793 filed May 8, 2013, which is hereby incorporated herein by reference in its entirety.

TECHNICAL FIELD

This application relates generally to cloud-based file storage. More particularly, this application relates to the internal file sharing in a cloud-based file storage.

BACKGROUND

With the dramatic increase in use of mobile devices in recent years, it has become more important now than ever before that a user's files be synchronized between multiple devices. A single user may operate on a desktop computer, laptop computer, tablet computer, and mobile phone, editing the same document at different times on different devices. This issue is only going to become even more important as additional mobile devices, such as wearable computers and vehicle-based computers become popular mechanisms for editing files.

Problems, however, may be encountered as the synchronization of files across devices become more complex. Specifically, users may wish to share folders containing files with other users, which adds significant complexity to the management of files across multiple devices.

BRIEF DESCRIPTION OF DRAWINGS

The present disclosure is illustrated by way of example and not limitation in the figures of the accompanying drawings, in which like references indicate similar elements and in which.

DETAILED DESCRIPTION

Overview

The description that follows includes illustrative systems, methods, techniques, instruction sequences, and machine-readable media (e.g., computing machine program products) that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

In an example embodiment, various techniques are utilized in order to allow for efficient, accurate, and secure synchronization of files across multiple devices even in cases where a large number of events are occurring concurrently. This may include using an events-based technique to improve reliability during periods of file modifications being performed concurrently. In another example embodiment, name conflicts between different files may be resolved automatically.

Figure 1:
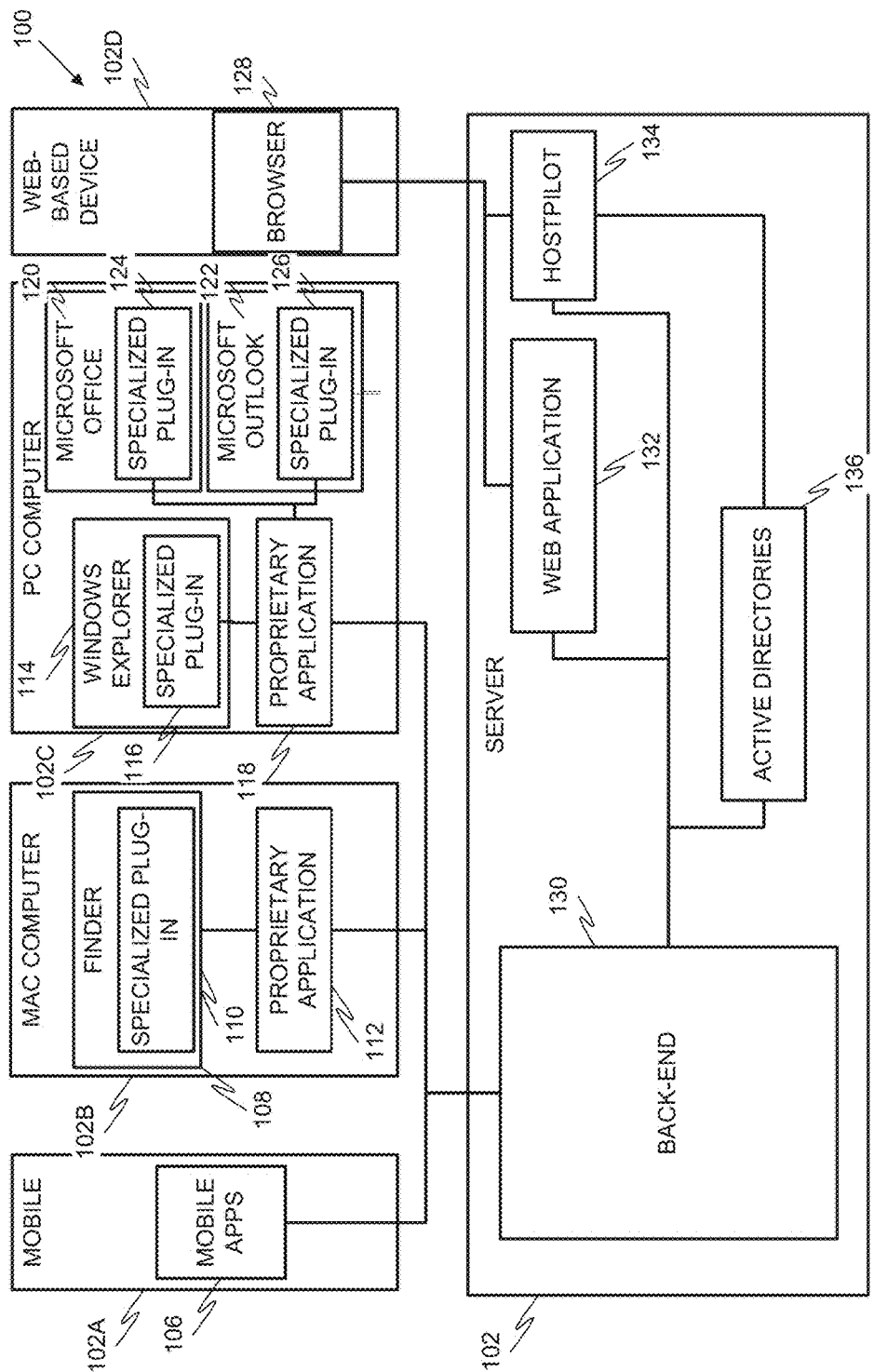
FIG. 1 is a block diagram illustrating a system, in accordance with an example embodiment, of securely synchronizing files.

FIG. 1 is a block diagram illustrating a system 100, in accordance with an example embodiment, of securely synchronizing files. In the system 100, files may be synchronized between one or more servers 102 and one or more client devices 104A-104D. The client devices 104A-104D may include various types of devices running various types of platforms with various types of operating systems and applications. For example, client device 104A may be a mobile device running proprietary mobile applications 106. Client device 104B may be a personal computer running a Macintosh™ operating system from Apple Inc. of Cupertino, Calif. This may include a file system known as Finder 108, which may include a specialized plug-in 110 to allow Finder 108 to be altered in order to better operate with a proprietary application 112.

Client device 104C may be a personal computer running a Windows™ operating system from Microsoft Corp. of Redmond, Wash. This may include a file system known as Windows Explorer 114, which may include a specialized plug-in 116 to allow Windows Explorer 114 to be altered in order to better operate with a proprietary application 118. Additionally, applications such as Microsoft Office™ 120 and Microsoft Outlook™ 122 may also include their own specialized plug-ins 124, 126, respectively, which allow them to better operate with the proprietary application 118. Client device 104D may be a web-based device that may operate a web browser 128 instead of a traditional operating system.

Each of the client devices 104A-104D may communicate with a back-end 130 hosted by the one or more servers 102. This communication may either take place directly between the back-end 130 and the proprietary applications 106, 112, 118, or indirectly through a web application 132. A provisioning service, such as HostPilot™ 134 may also be present, and may coordinate with a directory service such as Active Directories 136.

Figure 2:
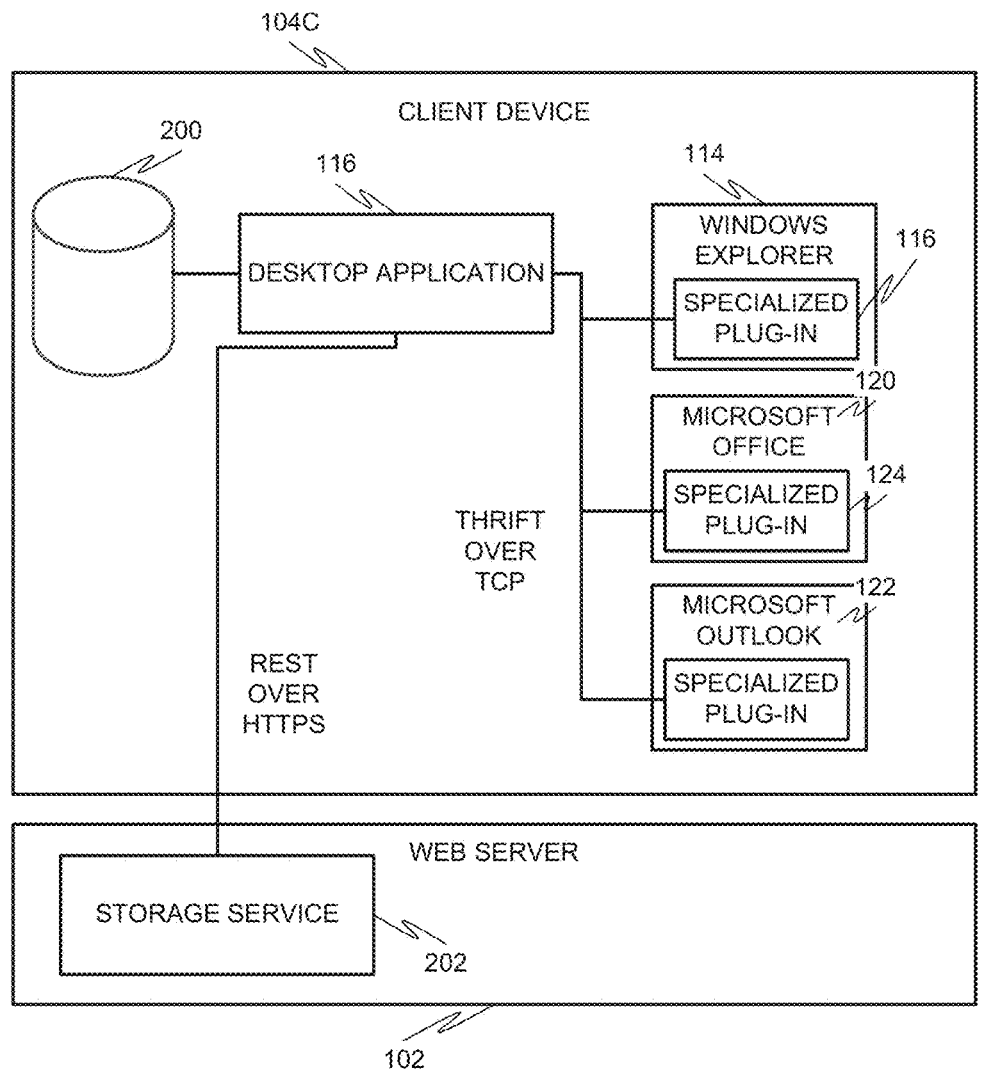
FIG. 2 is a block diagram illustrating a client device, in accordance with an example embodiment, that may form part of the system of FIG. 1.

FIG. 2 is a block diagram illustrating a client device, in accordance with an example embodiment, in more detail. In an example embodiment, the client device in this figure corresponds to client device 104C of FIG. 1, although in some example embodiments this diagram corresponds to a different client device. Additionally, the various components in FIG. 2 are labeled as those components are labeled in FIG.

1. In some embodiments, however, the components may not be identical. Proprietary application 116 may be a desktop application, and may store files in a local database 200. The proprietary application 118 may also communicate with specialized plug-ins 116, 124, 126 in Windows Explorer 114, Microsoft Office 120 and Microsoft Outlook™ 122, respectively. This communication may take place, for example, using Thrift over TCP. The proprietary application 118 may communicate with a storage service 202 on the server 102.

Figure 3:
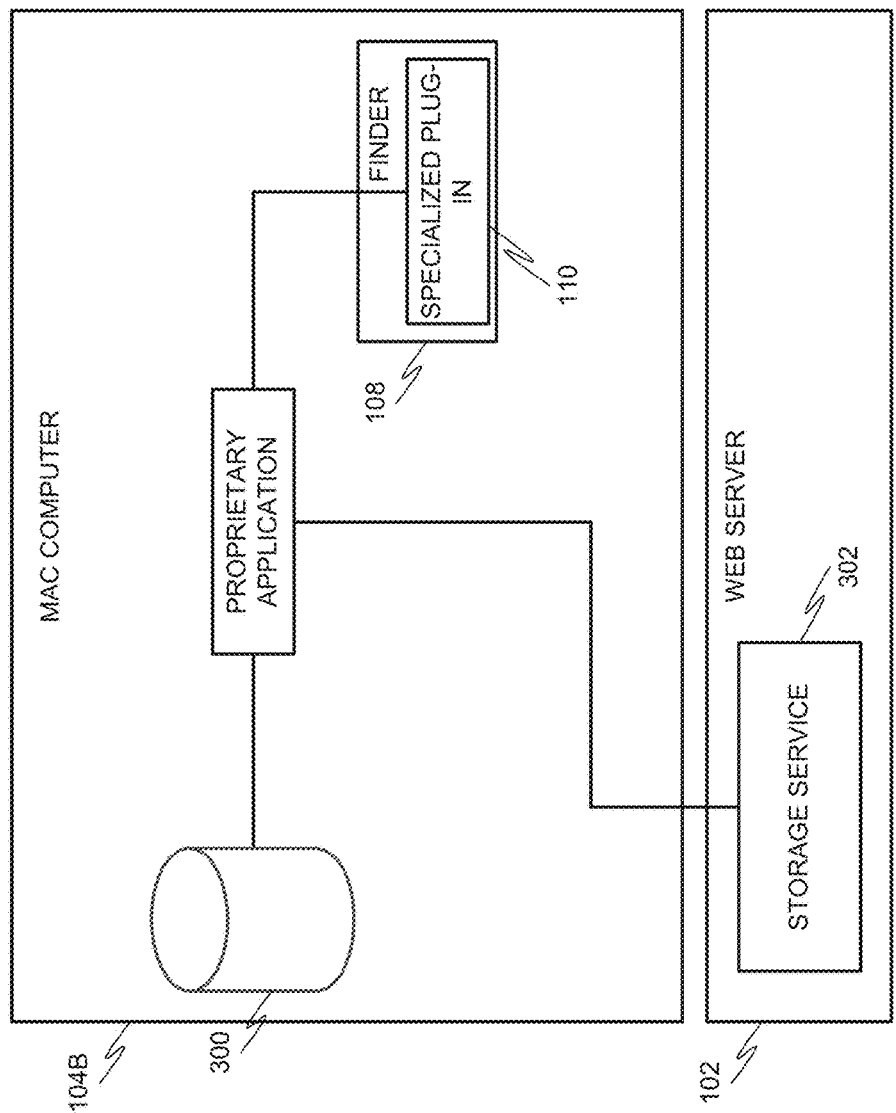
FIG. 3 is a block diagram illustrating another client device, in accordance with an example embodiment, that may form part of the system of FIG. 1.

FIG. 3 is a block diagram illustrating another client device, in accordance with an example embodiment, in more detail. In an example embodiment, the client device in this figure corresponds to client device 104B of FIG. 1, although in some example embodiments this diagram corresponds to a different client device. Additionally, the various components in FIG. 3 are labeled as those components are labeled in FIG. 1. In some embodiments, however, the components may not be identical. Proprietary application 112 may be a desktop application, and may store files in a local database 300. The proprietary application 112 may also communicate with a specialized plugin 108 in Finder 110. This communication may take place, for example, using Thrift over TCP. The proprietary application 118 may communicate with a storage device 302 on the server 102.

Figure 4:
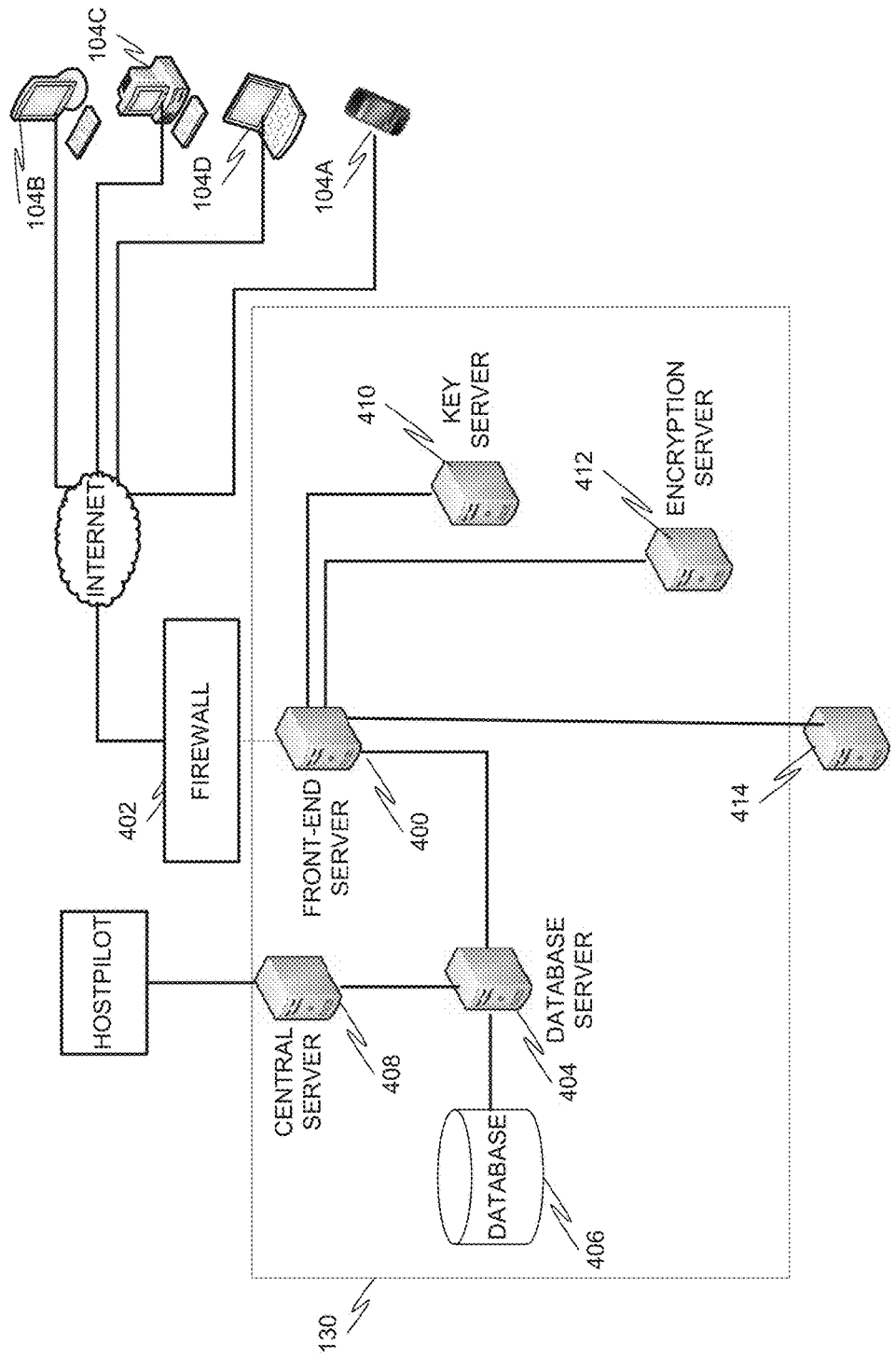
FIG. 4 is a block diagram illustrating a backend, in accordance with an example embodiment, that may form part of the system of FIG. 1.

FIG. 4 is a block diagram illustrating a backend, in accordance with an example embodiment, in more detail. In an example embodiment, the backend in this figure corresponds to backend 130 of FIG. 1, although in some example embodiments this diagram corresponds to a different backend. Additionally, the various components in FIG. 4 are labeled as those components are labeled in FIG. 1. In some embodiments, however, the components may not be identical. The backend 130 may include a front-end server 400, which acts to perform much of the server-side storage functions described in this disclosure, as well as interfacing with the various devices. These functions will be discussed in more detail later in this document. The front-end server 400 may interface with client devices 104A-104D through a firewall 402. The front-end server 400 may also interface with a database server 404, which may control access to a database 406. The database 406 may be of many different types of formats. In one example embodiment, the database 406 is a relational database, such as one operated using Structured Query Language (SQL). Other formats of database are envisioned, however, as well, including flat-file and multidimensional databases. The database may store not just files and folders, but also metadata about the files and folders, including, but not limited to, information about which files and folders are shared, and with whom.

A central server 408 performs internal tasks such as cleanup, provisioning, and other backend services. A key management server 410 provides access for keys created for each user. When a user is created on the central server 408, a key may be issued by the key server 410. These keys are also used by an encryption server 412 to encrypt and decrypt files and folders. This is accomplished through the use of the front end server 400, which understands which organization the keys belong and submits file or folder content to the encryption server 412 for encryption. Active Directories 414 is used for integration with Exchange™.

Internal Sharing

In an example embodiment, files to be synchronized between devices may be organized into folders. This allows a user to share an entire grouping of files with other users in an organization. The user initially sharing the folder can be referred to as the owner of the folder. The users with which the owner shares the folder can be referred to as grantees. In an example embodiment, the owner of a folder can share that folder with another user (grantee) from his/her organization using, for example, a web application. When a folder is shared, the grantee can receive a sharing invitation that can be either accepted or rejected using the web application. When the grantee accepts the sharing invitation, the desktop application can create the shared folder locally (on the device of the grantee) in specific folder (e.g. My SecuriSync\Shared Folder) and then synchronize this new local folder with the server folder.

Notably, the owner and all the grantees could conceivably have multiple instances of the folder stored on a variety of different devices. For example, an owner may have an instance of the folder on a desktop computer and a mobile phone, while one of the grantees may have an instance of the folder on a laptop computer and a tablet computer. All of these instances may be synchronized, not just for each user but among all the users having access to the folder.

A folder can be shared by the owner at a number of different permission levels. In an example embodiment, the permission levels include View, Modify or Co-owner permission. The View permission allows viewing but not modification of the files in the folder. Thus, if a folder is shared with View permission, then if the grantee locally modifies one of the files in the folder, the local file will be overwritten with the server version. The modified version can be saved to a conflict file. Also, if the grantee locally deletes a file/folder that exists on the server, the file/folder will be restored locally. If the grantee having View permission locally creates a new file/folder, it will not be synchronized by the desktop application.

It should be noted that in some example embodiments the view permission only applies to the version of the files potentially shared with other users. In some example embodiments, if a user having view permission makes a modification to a file and saves that modification locally, the modified version can be shared with the user's other devices. In one example embodiment, this may be accomplished by synchronizing the conflict folder among the user's devices.

In an example embodiment, if a folder is shared with Modify or Co-owner permission, then if the grantee locally modifies a file that exists on the server or creates a new file, the local file version will be synchronized to the server (if there is no version conflict, which will be described in more detail below). Also, if the grantee locally creates a new folder, it will be created on the server by the desktop app. If the grantee locally deletes a file/folder that exists on the server, the file/folder will be deleted on server.

Sub Folder Sharing

In an example embodiment, a folder may be shared with a different user (grantee) regardless of its level in a folder hierarchy. The grantee may have one of a number of different permission levels (e.g., view, modify, co-owner). In the prior art, if a subfolder of a folder was to be shared, the entire folder (including other subfolders) would also have to be shared. In an example embodiment the subfolder can be shared regardless of whether or not the parent folder is shared. Permissions for folders and subfolders are each stored independently, allowing each folder or subfolder to be shared or not shared independently. If a subfolder is shared it may appear on grantee's devices as top-level folder while simultaneously appearing as a mid-level folder (subfolder) on the owner's devices.

In an example embodiment, if a parent folder is later shared with a grantee that already has permissions for a sub-folder of that parent folder, an issue may arise in that the grantee may get confused if suddenly the sub-folder disappears from a main directory and is placed in a new folder unbeknownst to the grantee. As such, in an example embodiment, if a parent folder is shared with a grantee that already has permissions for a sub-folder of that parent folder, the new shared parent folder may appear on the user's device as a top-level folder, while the sub-folder also remains as a top-level folder, with the same permissions as it had before. Both the top-level folder and the subfolder may be synchronized with each other, despite both being stored in the same instance of the file system (e.g., on the same device).

It should be noted that in an example embodiment if a parent folder is shared, then the sub-folders within that folder inherit the permission level of the parent.

Figure 5:
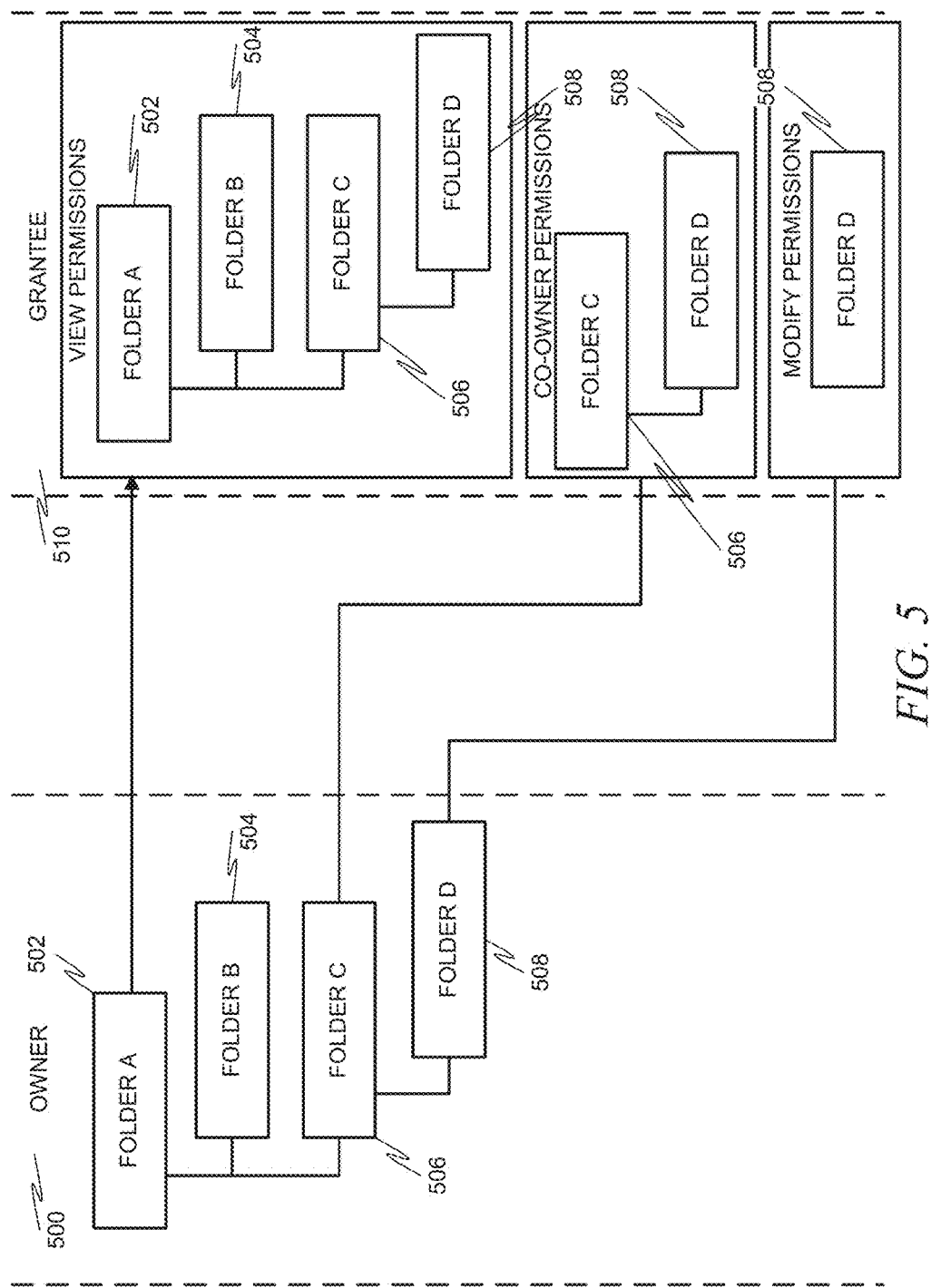
FIG. 5 is a diagram illustrating sub-folder sharing in accordance with an example embodiment.

FIG. 5 is a diagram illustrating sub-folder sharing in accordance with an example embodiment. An owner 500 may wish to share various folders and subfolders 502-508 with a grantee 510. This sharing may occur at various permission levels. The user may wish to grant viewing permission to Folder A 502, which then means that all subfolders 504, 506, 508 are also shared with the grantee 510 at the view permission level. This results in the grantee 510 seeing all of the folders 502-508 when viewing folders in the view permission level. If the grantee 510 wishes to see only those folders that he has co-owner permissions to, however, he will only see Folder C 506 and Folder D 508. Likewise, if the grantee 510 wishes to see only those folders that he has modify permissions to, then he will only see Folder D 508.

The various sharing permissions may be stored with the files/folders. When a folder is shared with a grantee, a virtual folder corresponding to the folder can be created on a device of the grantee. All objects within the folder can be copidd to the virtual folder to share and mapped to the existing objects. Additionally, the shared folder may be stored at a level equal to parent folders of a file hierarchy on the device of the user.

Figure 6:
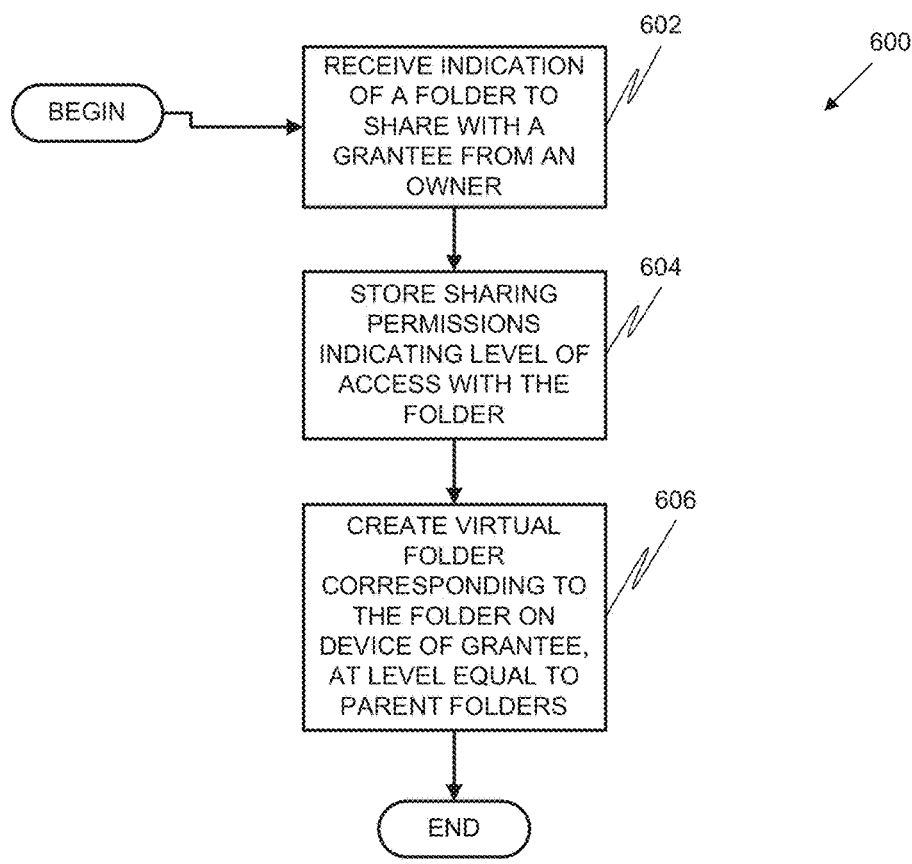
FIG. 6 is a flow diagram illustrating a method, in accordance with an example embodiment, for sharing a folder in a file system between an owner and a grantee.

FIG. 6 is a flow diagram illustrating a method 600, in accordance with an example embodiment, for sharing a folder in a file system between an owner and a grantee. At operation 602, an indication of a folder to share with a grantee may be received from the owner. The folder to share may be a subfolder within a parent folder. The parent folder, in this instance, is not shared with the grantee. At operation 604, sharing permissions indicating a level of access the grantee has to the folder are stored with the folder. At operation 606, a virtual folder corresponding to the folder is created on a device of the grantee, the virtual folder mapping to all objects within the folder to share and being stored at a level equal to parent folders of a file hierarchy on the device of the grantee.

File Version Conflict Resolution

A file version conflict may occur in the following situations:

If the file has been modified locally and on the server after the last synchronization and the server version differs from the local version.

If the file has not been synchronized and the server version differs from the local version.

If the file has been modified locally after the last synchronization and the user has View permission to this file.

In these cases, in an example embodiment, the local file is copied to the conflict file and then the local file is overwritten with the server version.

The conflict file is created in the same folder as the original file and has the name <original file name>(Conflicted copy <YYYY-MM-DD>-for <user name>).<original file extension> (e.g. "document(Conflicted copy 2013-04-04-for Nikita Uraltsev).docx")

Example Mobile Device

Figure 7:
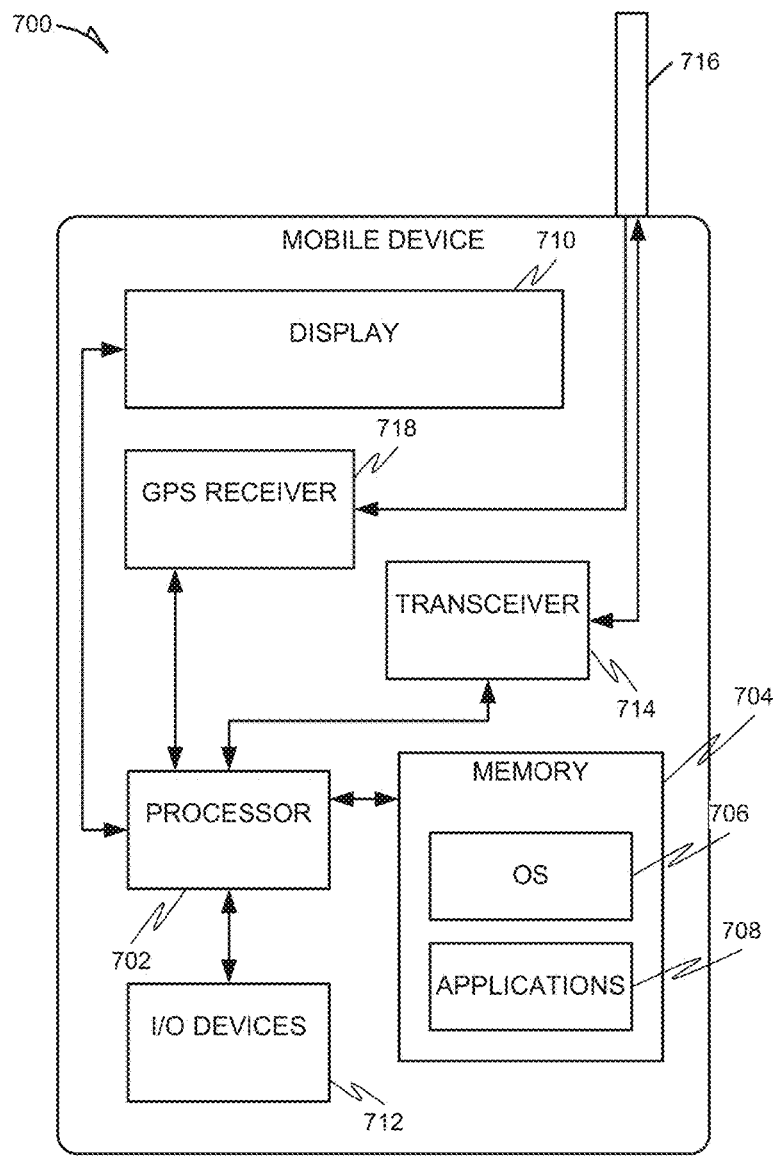
FIG. 7 is a block diagram illustrating a mobile device, in accordance with an example embodiment.
Figure 8:
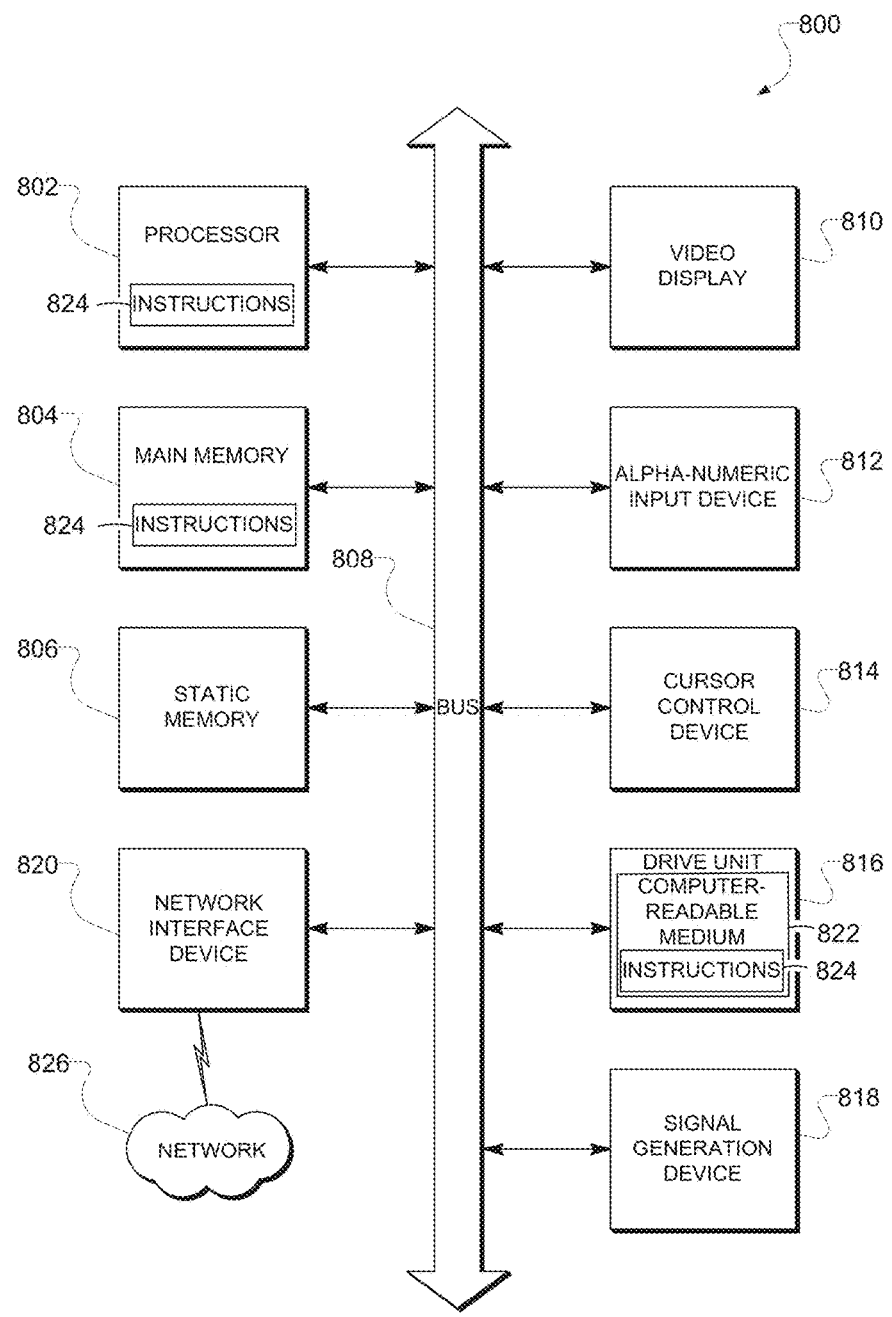
FIG. 8 is a block diagram of machine in the example form of a computer system within which instructions, for causing the machine to perform any one or more of the methodologies discussed herein, can be executed.

FIG. 7 is a block diagram illustrating a mobile device 700, according to an example embodiment. The mobile device 700 can include a processor 702. The processor 702 can be any of a variety of different types of commercially available processors suitable for mobile devices 700 (for example, an XScale architecture microprocessor, a Microprocessor without Interlocked Pipeline Stages (MIPS) architecture processor, or another type of processor). A memory 704, such as a random access memory (RAM), a Flash memory, or other type of memory, is typically accessible to the processor 702. The memory 704 can be adapted to store an operating system (OS) 706, as well as application programs 708, such as a mobile location enabled application that can provide LBSs to a user. The processor 702 can be coupled, either directly or via appropriate intermediary hardware, to a display 710 and to one or more input/output (I/O) devices 712, such as a keypad, a touch panel sensor, a microphone, and the like. Similarly, in some embodiments, the processor 702 can be coupled to a transceiver 714 that interfaces with an antenna 716. The transceiver 714 can be configured to both transmit and receive cellular network signals, wireless data signals, or other types of signals via the antenna 716, depending on the nature of the mobile device 700. Further, in some configurations, a GPS receiver 718 can also make use of the antenna 716 to receive GPS signals.

Modules, Components and Logic

Certain embodiments are described herein as including logic or a number of components, modules, or mechanisms. Modules can constitute either software modules (e.g., code embodied (1) on a non-transitory machine-readable medium or (2) in a transmission signal) or hardware-implemented modules. A hardware-implemented module is tangible unit capable of performing certain operations and can be configured or arranged in a certain manner. In example embodiments, one or more computer systems (e.g., a standalone, client or server computer system) or one or more processors can be configured by software (e.g., an application or application portion) as a hardware-implemented module that operates to perform certain operations as described herein.

In various embodiments, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor can be configured as respective different hardware-implemented modules at different times. Software can accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple such hardware-implemented modules exist contemporaneously, communications can be achieved through signal transmission (e.g., over appropriate circuits and buses) that connect the hardware-implemented modules. In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one of processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment or as a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the Internet) and via one or more appropriate interfaces (e.g., application program interfaces (APIs).)

Electronic Apparatus and System

Example embodiments can be implemented in digital electronic circuitry, or in computer hardware, firmware, software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry, e.g., a FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

Example Machine Architecture and Machine-Readable Medium

FIG. 15 is a block diagram of machine in the example form of a computer system 1500 within which instructions, for causing the machine to perform any one or more of the methodologies discussed herein, can be executed. In alternative embodiments, the machine operates as a standalone device or can be connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU), or both), a main memory 1504 and a static memory 1506, which communicate with each other via a bus 1508. The computer system 1500 can further include a video display unit 1510 (e.g., a liquid crystal display (LCD) or a cathode ray tube (CRT)). The computer system 1500 also includes an alpha-numeric input device 1512 (e.g., a keyboard or a touch-sensitive display screen), a user interface (UI) navigation device 1514 (e.g., a mouse), a disk drive unit 1516, a signal generation device 1518 (e.g., a speaker), and a network interface device 1520.

Machine-Readable Medium

The disk drive unit 1516 includes a machine-readable medium 1522 on which is stored one or more sets of instructions and data structures (e.g., software) 1524 embodying or utilized by any one or more of the methodologies or functions described herein. The instructions 1524 can also reside, completely or at least partially, within the main memory 1504 and/or within the processor 1502 during execution thereof by the computer system 1500, with the main memory 1504 and the processor 1502 also constituting machine-readable media 1522.

While the machine-readable medium 1522 is shown in an example embodiment to be a single medium, the term "machine-readable medium" can include a single medium or multiple media (e.g., a centralized or distributed database, and/or associated caches and servers) that store the one or more instructions or data structures 1524. The term "machine-readable medium" shall also be taken to include any tangible medium that is capable of storing, encoding or carrying instructions 1524 for execution by the machine and that cause the machine to perform any one or more of the methodologies of the present disclosure, or that is capable of storing, encoding or carrying data structures utilized by or associated with such instructions 1524. The term "machine-readable medium" shall accordingly be taken to include, but not be limited to, solid-state memories, and optical and magnetic media. Specific examples of machine-readable media 1522 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1524 can further be transmitted or received over a communications network 1526 using a transmission medium. The instructions 1524 can be transmitted using the network interface device 1520 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1524 for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A method of sharing a folder in a file system between an owner and a grantee, the method comprising:
   receiving an indication of a folder to share with a grantee from the owner, the folder to share being a subfolder within a parent folder, the parent folder not shared with the grantee;
   storing, with the subfolder itself, sharing permissions indicating a level of access the grantee has to the subfolder;
   creating a virtual folder corresponding to the subfolder on a device of the grantee, the virtual folder mapping to all objects within the subfolder and being stored at a level equal to parent folders of a file hierarchy on device of the grantee;
   altering permissions of the parent folder to share the parent folder with the grantee; and
   creating a virtual folder corresponding to the parent folder on the device of the grantee, the virtual folder corresponding to the parent folder mapping to all objects within the parent folder being stored at a level equal to subfolder on the device of the grantee, without deleting the subfolder on the device of the grantee.

2. The method of claim 1, wherein the sharing permissions indicate whether the grantee is permitted to modify contents of the folder or not.

3. The method of claim 2, wherein in response to a determination that the grantee is not permitted to modify contents of the folder, and in response to an action by the grantee to modify an object of the folder, placing a copy of the object as modified in a folder on the device of the grantee without synchronizing the modification to the corresponding object in the folder.

4. The method of claim 3, wherein the folder in which the copy of the object as modified is placed is a conflict folder separate from the virtual folder.

5. The method of claim 2, wherein in response to a determination that the grantee is permitted to modify contents of the folder, and in response to an action by the grantee to modify an object of the folder, saving the modified object in the virtual folder and synchronizing the modified object with the folder.

6. The method of claim 1, further comprising synchronizing the virtual folder with one or more additional virtual folders on other devices of the grantee and synchronizing the folder with one or more additional folders on other devices of the owner.

7. A system comprising: one or more processors; a memory configured to store a first instance of a file space; an item manager executable by the one or more processors and configured to:
- receive an indication of a folder to share with a grantee from an owner, the folder to share being a subfolder within a parent folder, the parent folder not shared with the grantee;
- store, with the subfolder, sharing permissions indicating a level of access the grantee has to the subfolder;
- create a virtual folder corresponding to the subfolder in the first instance of the file space, the virtual folder mapping to all objects within the subfolder and being stored at a level equal to parent folders of a file hierarchy in the first instance of the file space;
- wherein the item manager is further configured to alter permissions of the parent folder to share the parent folder with the grantee; and
- create a virtual folder corresponding to the parent folder on the device of the grantee, the virtual folder corresponding to the parent folder mapping to all objects within the parent folder being stored at a level equal to the folder to share on the device of the grantee, without deleting the folder to share on the device of the grantee.

8. The system of claim 7, wherein the item manager is further configured to, in response to a determination that the grantee is not permitted to modify contents of the folder, and in response to an action by the grantee to modify an object of the folder, place a copy of the object as modified in a folder on the device of the grantee without synchronizing the modification to the corresponding object in the folder.

9. The system of claim 8, wherein the folder in which the copy of the object as modified is placed is a conflict folder separate from the virtual folder.

10. The system of claim 7, wherein the item manager is further configured to, in response to a determination that the grantee is permitted to modify contents of the folder, and in response to an action by the grantee to modify an object of the folder, save the modified object in the virtual folder and synchronize the modified object with the folder.

11. The system of claim 7, wherein the item manager is further configured to synchronize the virtual folder with one or more additional virtual folders on other devices of the grantee and synchronizing the folder with one or more additional folders on other devices of the owner.

12. A non-transitory machine-readable storage medium comprising instructions, which when implemented by one or more machines, cause the one or more machines to perform operations comprising: receiving an indication of a folder to share with a grantee from the owner, the folder to share being a subfolder within a parent folder, the parent folder not shared with the grantee; storing, with the folder, sharing permissions indicating a level of access the grantee has to the folder;
- creating a virtual folder corresponding to the folder to share on a device of the grantee, the virtual folder mapping to all objects within the folder to share and being stored at a level equal to parent folders of a file hierarchy on device of the grantee;
- wherein the operations further comprise: altering permissions of the parent folder to share the parent folder with the grantee; and
- creating a virtual folder corresponding to the parent folder on the device of the grantee, the virtual folder corresponding to the parent folder mapping to all objects within the parent folder being stored at a level equal to the folder to share on the device of the grantee, without deleting the folder to share on the device of the grantee.

13. The non-transitory machine-readable storage medium of claim 12, wherein the sharing permissions indicate whether the grantee is permitted to modify contents of the folder or not.

14. The non-transitory machine-readable storage medium of claim 13, wherein in response to a determination that the grantee is not permitted to modify contents of the folder, and in response to an action by the grantee to modify an object of the folder, placing a copy of the object as modified in a folder on the device of the grantee without synchronizing the modification to the corresponding object in the folder.

15. The non-transitory machine-readable storage medium of claim 14, wherein the folder in which the copy of the object as modified is placed is a conflict folder separate from the virtual folder.

16. The non-transitory machine-readable storage medium of claim 13, wherein in response to a determination that the grantee is permitted to modify contents of the folder, and in response to an action by the grantee to modify an object of the folder, saving the modified object in the virtual folder and synchronizing the modified object with the folder.

17. The non-transitory machine-readable storage medium of claim 12, wherein the operations further comprise synchronizing the virtual folder with one or more additional virtual folders on other devices of the grantee and synchronizing the folder with one or more additional folders on other devices of the owner.

* * * * *